(12) United States Patent
Huson et al.

(10) Patent No.: US 11,968,123 B1
(45) Date of Patent: Apr. 23, 2024

(54) METHODS FOR ALLOCATING A TRAFFIC LOAD AND DEVICES THEREOF

(71) Applicant: F5, Inc., Seattle, WA (US)

(72) Inventors: Adam Huson, Seattle, WA (US); Hao Cai, Seattle, WA (US); Navin Donkana, Seattle, WA (US)

(73) Assignee: F5, Inc., Seattle, WA (US)

( * ) Notice: Subject to any disclaimer, the term of this patent is extended or adjusted under 35 U.S.C. 154(b) by 0 days.

(21) Appl. No.: 18/077,389

(22) Filed: Dec. 8, 2022

(51) Int. Cl.
*H04L 47/125* (2022.01)
*H04L 45/42* (2022.01)
*H04L 47/2441* (2022.01)

(52) U.S. Cl.
CPC ............ *H04L 47/125* (2013.01); *H04L 45/42* (2013.01); *H04L 47/2441* (2013.01)

(58) Field of Classification Search
CPC .... H04L 47/125; H04L 47/2441; H04L 45/42
See application file for complete search history.

(56) References Cited

U.S. PATENT DOCUMENTS

| | | | |
|---|---|---|---|
| 7,280,540 B2 * | 10/2007 | Halme | H04L 69/22 713/153 |
| 9,465,548 B1 | 10/2016 | Hrischuk | |
| 9,621,577 B2 | 4/2017 | Akein | |
| 9,628,509 B2 | 4/2017 | Holloway et al. | |
| 9,674,064 B1 | 6/2017 | Thorson | |
| 9,749,355 B1 | 8/2017 | Benson et al. | |
| 10,164,885 B2 * | 12/2018 | Shen | H04L 45/7453 |
| 10,200,402 B2 | 2/2019 | Radlein et al. | |
| 10,810,528 B1 | 10/2020 | Phillips | |
| 11,302,215 B2 | 4/2022 | Donovan | |

(Continued)

FOREIGN PATENT DOCUMENTS

| | | |
|---|---|---|
| WO | 2006004556 A1 | 1/2006 |
| WO | 2016164403 A1 | 10/2016 |

OTHER PUBLICATIONS

Xu et al., "A Survey on Regularf Expression Mathcing for Deep Packet Insepction: Applications, Algorithms, and Hardware Platforms", IEEE Communications Surveys & Tutorials, vol. 18, Issue 4, Fourthquarter 2016, May 11, 2016, IEEE Publishing.*

(Continued)

*Primary Examiner* — Todd L Barker
(74) *Attorney, Agent, or Firm* — Troutman Pepper Hamilton Sanders LLP (F5 PATENTS)

(57) ABSTRACT

Methods, non-transitory computer readable media, network traffic manager apparatuses, and systems that assist with allocating a traffic load through heterogenous topology of a network includes extracting a header of each of a plurality of received packets of a traffic flow. Each of the headers comprises fields. Next, the network traffic manager apparatus executes a hashing function over the fields of each of the headers, applies a load balancing function to determine one of a plurality of endpoints to send each of the received packets based on one or more endpoint characteristics, and maps the index for each corresponding one of the received packets to the corresponding selected one of the endpoints. The received packets are not evenly divided among the plurality of endpoints. Lastly, the network traffic manager apparatus sends the received packets selected endpoint based on the mapping from the load balancing policy.

20 Claims, 4 Drawing Sheets

(56) References Cited

U.S. PATENT DOCUMENTS

| | | | |
|---|---|---|---|
| 2005/0183084 A1 | 8/2005 | Cuomo | |
| 2007/0280114 A1 | 12/2007 | Chao | |
| 2011/0317566 A1 | 12/2011 | Keen | |
| 2014/0056146 A1* | 2/2014 | Hu | H04L 47/825 370/235 |
| 2015/0358402 A1 | 12/2015 | Stolyar | |
| 2016/0080398 A1 | 3/2016 | Yablokov | |
| 2016/0301624 A1 | 10/2016 | Gonzalez | |
| 2019/0158533 A1 | 5/2019 | Holloway et al. | |
| 2019/0356729 A1 | 11/2019 | Bivens | |
| 2020/0226144 A1 | 7/2020 | Chen | |
| 2020/0311573 A1 | 10/2020 | Desai | |
| 2020/0389430 A1 | 12/2020 | Di Mattia | |
| 2021/0174281 A1 | 6/2021 | Bhaskara | |
| 2021/0400029 A1* | 12/2021 | Wang | H04L 63/164 |

OTHER PUBLICATIONS

Zhang et al., "TripodL Towards a Scalable, Efficient and Resilient Cloud Gateway", IEEE Journal on Selected Areas in Communications, vol. 37, Issue 3, Mar. 2019, IEEE Publishing.*

Van Lunteren et al., "Designing a Programmable Wire-Speed Regular-Expression Matching Acclerator", 45th Annual IEEE/ACM International Symposium on Microarchitecture, Dec. 1, 2012, IEEE Publishing.*

Lin et al., "A Survey on Network Security-Related Data Collection Techniques", IEEE Access (vol. 6), Mar. 21, 2018.*

Pit_Claudel et al., "Stateless Load-Aware Load Balancing in P4" IEEE 26th International Conference on Network Protocols, Sep. 25, 2018, IEEE Publlishing.*

Wu et al. "SPMLD: Sub-packet based multipath load distribution for real-time multimedia traffic", Journal of Communication and Networks, vol. 16, Issue 5,, Oct. 2014.*

IPRP for PCT/US2020/057241, dated May 17, 2022.

International Search Report for corresponding PCT Application No. PCT/US20/57241, dated Feb. 5, 2020.

Rase et al., "An Efficient Way to Prevent Dos/DDos Attack in the Cloud Environment", International Journal of Science and Research, vol. 05, Issue 03, Mar. 2016, pp. 829-832.

Bormode, et al. "An Improved Data Stream Summary: The Count-Min Sketch and its Applications", J. Algorithms.55: 29-38 (2005).

Renjan, et al., "DAbR: Dynamic Attribute-based Reputation scoring for Malicious IP Address Detection", 2018 IEEE.

IPv4 Address: Structure, Classes and Types study.com, Aug. 27, 2019 URL:https://www.study.com/academy/lesson/ipv4-address-structure-classes-and-types.html.

Kousiouris "Minimizing the Effect of DoS Attacks on Elastic Cloud-based Applications Based on Application-level Markov Chain Checkpoints", Proceedings of the 4th International Conference on Cloud Computing and Services Science (CLOSER-2014), pp. 622-628, 2014.

Kak, "Lecture 16: TCP/IP Vulnerabilities and DOS Attacks: IP Spoofing, SYN Flooding, and The Shrew DOS Attack", Lecture Notes on "Computer and Network Security", Mar. 7, 2019, Purdue University.

Bhouhan, et al., "Packet Monitoring Approach to Prevent DDOS Attack in Cloud Computing", International Journal of Bomputer Science and Electrical Engineering, vol. 1, Issue 1, 2012.

Mao, "TcCP Flow Control and Congestion Control", EECS 489 Computer Networks, http://www.eecs.umich.edu/aourses/eecs489/w07, Feb. 5, 2007.

Vvilkins, "The Anatomy of a Packet Path (ICMP) from Source to Destination", Pearson IT Certification, Aug. 27, 2019 URL:www.pearsonitcertification.com/articles.aspx?=1804873.

TTL Expiry Attack Identification and Mitigation, Cisco, Aug. 27, 2019 URL:https://www.cisco.com/c/en/us/about/security-center/ttl-expiry-attack.html.

Manfredi, et al., "Understanding Stateful vs Stateless Communication Strategies for Ad hoc Networks", MobiCom'11, Sep. 19-23, 2011, Las Vegas, NV.

* cited by examiner

METHODS FOR ALLOCATING A TRAFFIC LOAD AND DEVICES THEREOF

FIELD

This technology relates to methods and systems for allocating a traffic load through heterogenous topology of a network.

BACKGROUND

A system distributing and allocating a traffic load through an internal network usually evenly distributes traffic internally. Traffic received by a system can be stored for future use in a traffic management system. A system with large volume of traffic may require multiple traffic management systems to manage the heavy traffic. Each traffic management system can be called an endpoint. To direct incoming traffic to different endpoints, intermediate modules can be used internally for routing. The problem with evenly distributing traffic internally is that intermediate modules may begin dropping packets in the traffic, causing global backoff from clients. Dropping packets during routing of traffic results in ineffective performance within internal networks.

SUMMARY

A method for allocating a traffic load through heterogenous topology of a network, implemented in cooperation with a network traffic management system comprising one or more network traffic management modules, server modules, or client modules, includes extracting a header of each of a plurality of received packets of a traffic flow. Each of the headers comprises fields. Next, the method includes executing a hashing function over the fields of each of the headers, applying a load balancing function to determine one of a plurality of endpoints to send each of the received packets based on one or more endpoint characteristics, and mapping the index for each corresponding one of the received packets to the corresponding selected one of the endpoints. The received packets are not evenly divided among the plurality of endpoints. Lastly, the method includes sending the received packets selected endpoint based on the mapping from the load balancing policy.

A network traffic management apparatus including memory including programmed instructions stored thereon and one or more processors configured to be capable of executing the stored programmed instructions to extract a header of each of a plurality of received packets of a traffic flow. Each of the headers comprises fields. Next, execute a hashing function over the fields of each of the headers, apply a load balancing function to determine one of a plurality of endpoints to send each of the received packets based on one or more endpoint characteristics, and map the index for each corresponding one of the received packets to the corresponding selected one of the endpoints. The received packets are not evenly divided among the plurality of endpoints. Lastly, the send the received packets selected endpoint based on the mapping from the load balancing policy.

A non-transitory computer readable medium having stored thereon instructions for including executable code that, when executed by one or more processors, causes the processors to extract a header of each of a plurality of received packets of a traffic flow. Each of the headers comprises fields. Next, execute a hashing function over the fields of each of the headers, apply a load balancing function to determine one of a plurality of endpoints to send each of the received packets based on one or more endpoint characteristics, and map the index for each corresponding one of the received packets to the corresponding selected one of the endpoints. The received packets are not evenly divided among the plurality of endpoints. Lastly, the send the received packets selected endpoint based on the mapping from the load balancing policy.

A network traffic management system includes one or more traffic management modules, server modules, or client modules, memory comprising programmed instructions stored thereon, and one or more processors configured to be capable of executing the stored programmed instructions to extract a header of each of a plurality of received packets of a traffic flow. Each of the headers comprises fields. Next, execute a hashing function over the fields of each of the headers, apply a load balancing function to determine one of a plurality of endpoints to send each of the received packets based on one or more endpoint characteristics, and map the index for each corresponding one of the received packets to the corresponding selected one of the endpoints. The received packets are not evenly divided among the plurality of endpoints. Lastly, the send the received packets selected endpoint based on the mapping from the load balancing policy.

This technology provides a number of advantages including supporting an asymmetric load balancing scheme and topology. The system can effectively avoid overloaded endpoints and intermediate modules and can avoid dropping packets causing global backoff from the traffic flow.

DETAILED DESCRIPTION

Figure 1:
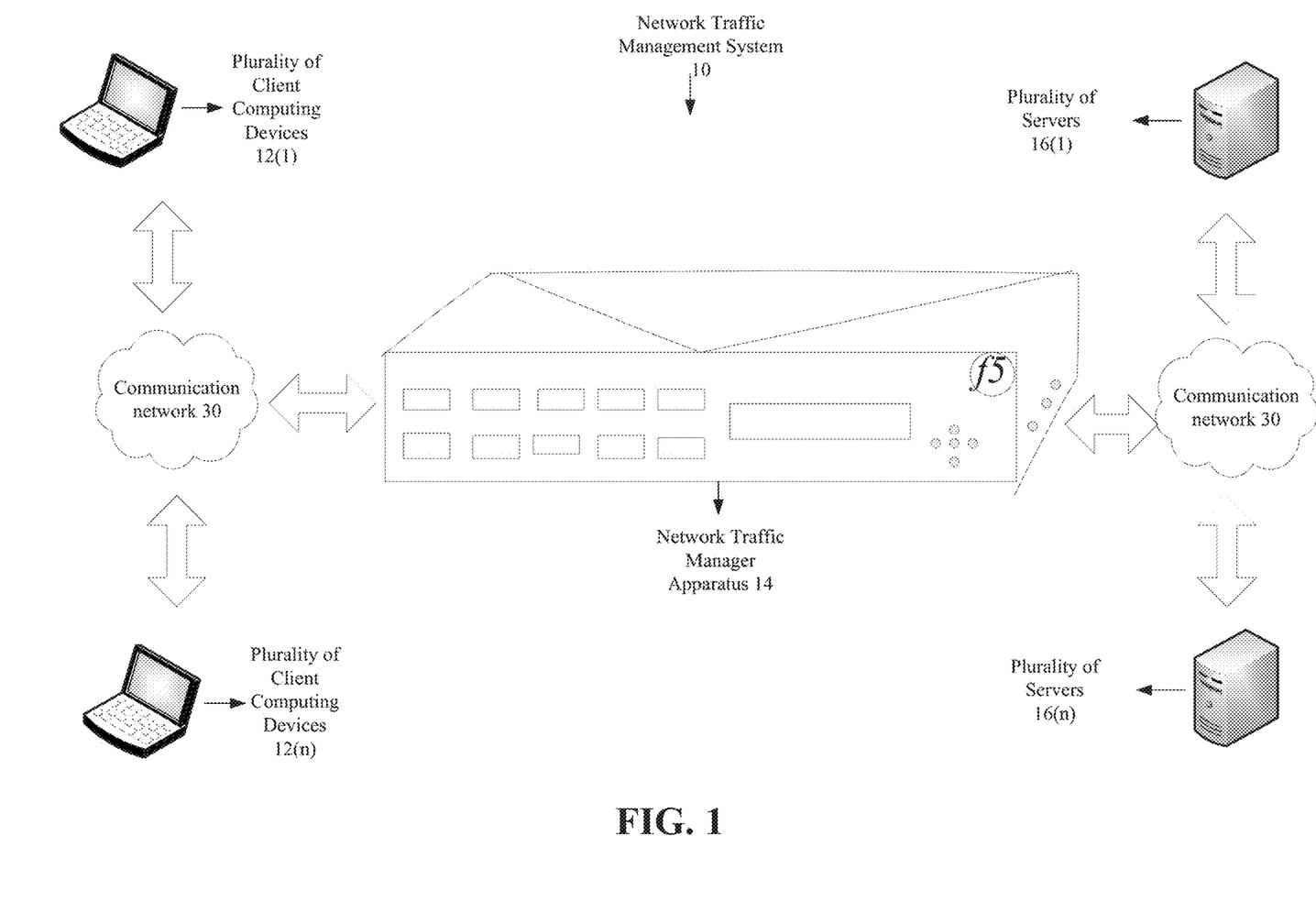
FIG. 1 is block diagrams of an exemplary network traffic management system with a network traffic management apparatus.
Figure 3:
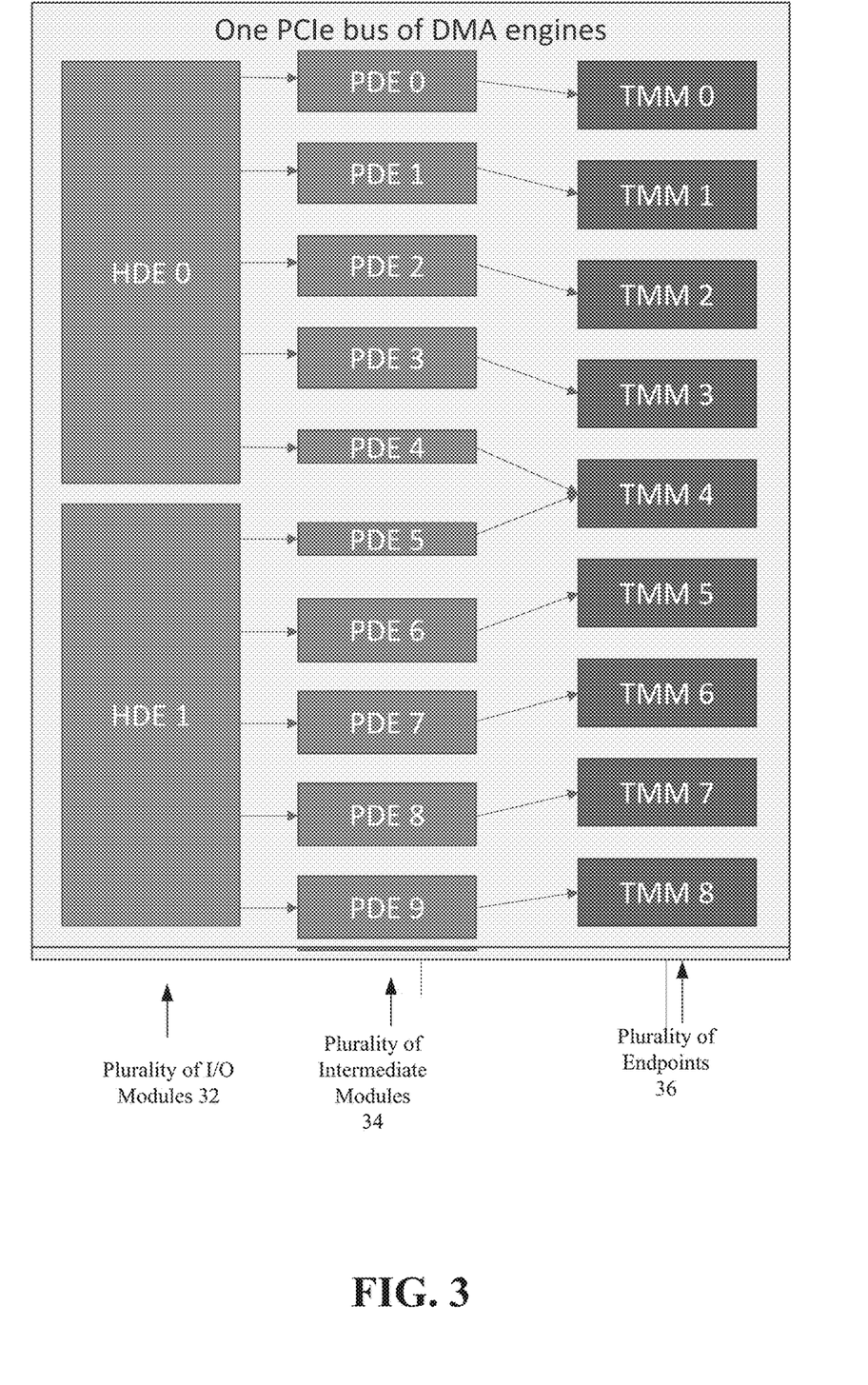
FIG. 3 is an exemplary environment of a network traffic management system.
Figure 4:
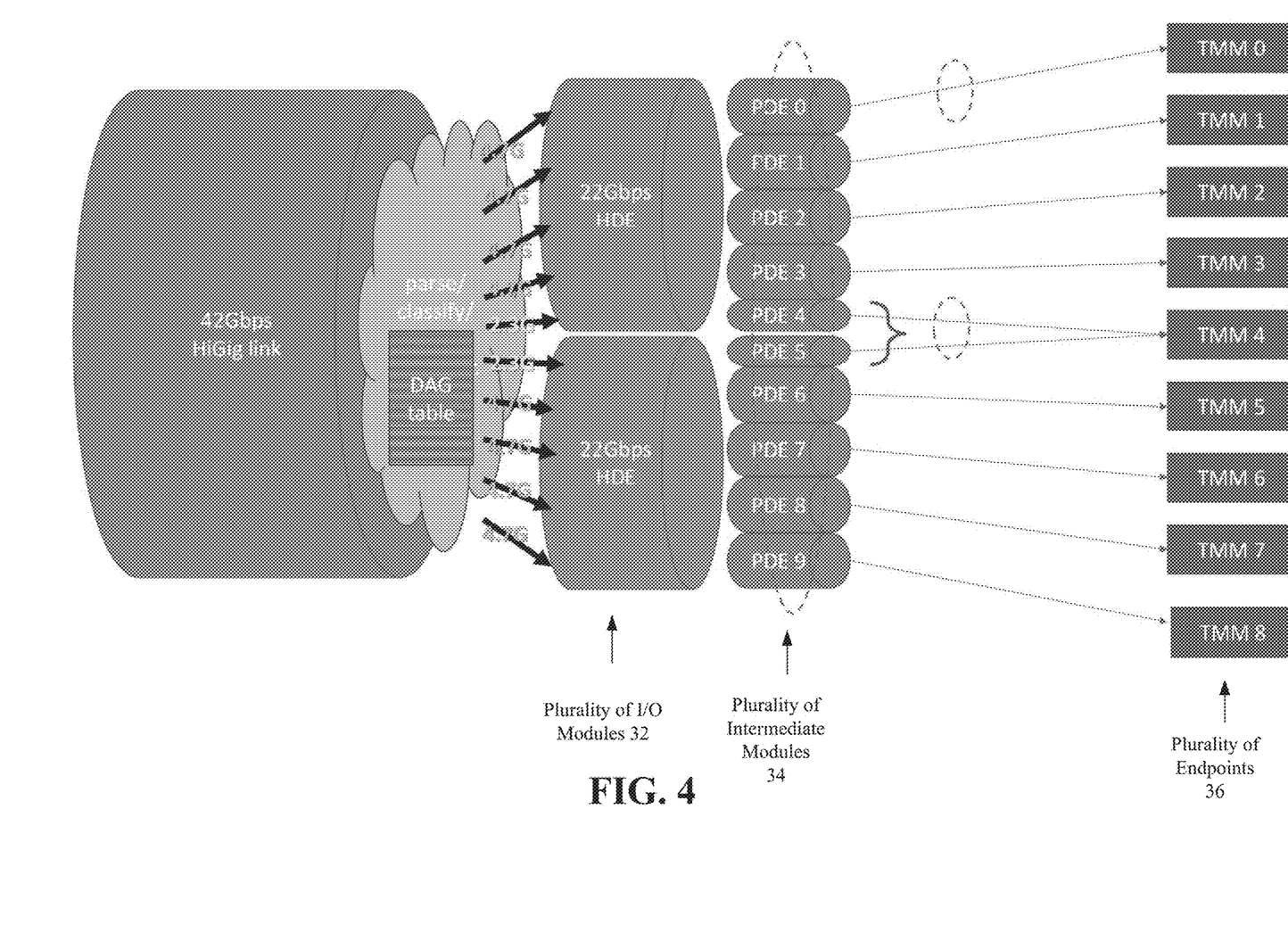
FIG. 4 is an exemplary environment of a network traffic management system.

An example of a network environment 10 which incorporates a network traffic management system for allocating a traffic load asymmetrically with the network traffic manager apparatus 14 is illustrated in FIGS. 1, 3, and 4. The exemplary environment 10 includes a plurality of client computing devices 12(1)-12(n), a network traffic manager apparatus 14, and a plurality of servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including allocating a traffic load asymmetrically.

Referring more specifically to FIG. 1, the network traffic manager apparatus 14 of the network traffic management system is coupled to the plurality of client computing devices 12(1)-12(n) through the communication network 30, although the plurality of client computing devices 12(1)-12(n) and network traffic manager apparatus 14 may be coupled together via other topologies. Additionally, the network traffic manager apparatus 14 is coupled to the plurality of servers 16(1)-16(n) through the communication network 30, although the servers 16(1)-16(n) and the network traffic manager apparatus 14 may be coupled together via other topologies.

Referring now more specifically to FIGS. 3 and 4, the network traffic manager apparatus 14 of the network traffic management system can include a plurality of input/output modules or I/O modules 32 with a set processing power. The I/O modules 32 or high density module ("HDEs") can be connected to intermediate modules 34 with different processing powers and capacities as well. The intermediate modules 34 or Packet Direct Memory Access Engines ("PDEs") can be connected to a plurality of endpoints 36 or traffic management systems/microkernels ("TMMs"). In some examples, the network traffic management system can include an uneven number of intermediate modules 34 or can include an even number of intermediate modules 34 with some of the intermediate modules 34 being inactive. This can lead to an asymmetric topology. In some examples, a single endpoint 36 or TMM is connected to one intermediate module 34 or PDE. In some examples, a plurality of intermediate modules 34 or PDEs can connect to a single endpoint 36 or TMM as depicted in FIGS. 3 and 4. In other non-limiting examples, a single intermediate module 34 or PDEs can topologically connect to a plurality of endpoints 36 or TMMs.

The network traffic manager apparatus 14 assists with allocating a traffic load asymmetrically as illustrated and described by way of the examples herein, although the network traffic manager apparatus 14 may perform other types and/or numbers of functions. The network traffic manager apparatus 14 can include processor or central processing unit (CPU), memory, and a communication system which are coupled together by a bus device although the network traffic manager apparatus 14 may comprise other types and numbers of elements in other configurations.

The processors within the network traffic manager apparatus 14 may execute one or more computer-executable instructions stored in memory for the methods illustrated and described with reference to the examples herein, although the processor can execute other types and numbers of instructions and perform other types and numbers of operations. The processor may comprise one or more central processing units ("CPUs") or general purpose processors with one or more processing cores, such as AMD® processor(s), although other types of processor(s) could be used (e.g., Intel®).

Figure 2:
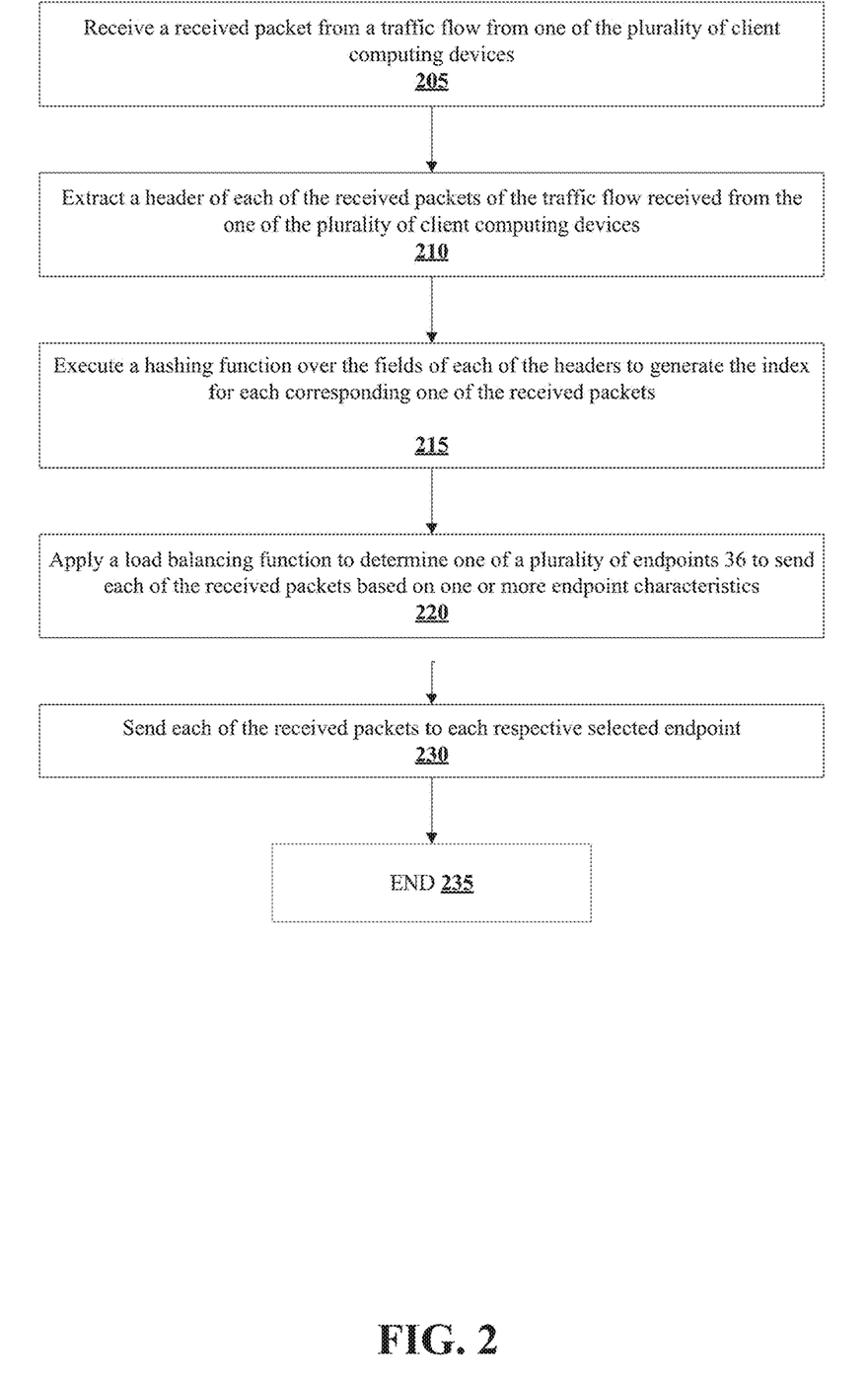
FIG. 2 is a flowchart of an exemplary method for allocating a traffic load asymmetrically.

The memory within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory may store one or more non-transitory computer-readable instructions of this technology as illustrated and described with reference to the examples herein that may be executed by the processor. The exemplary flowchart shown in FIG. 2 is representative of example steps or actions of this technology that may be embodied or expressed as one or more non-transitory computer or machine readable instructions stored in the memory that may be executed by the processor.

Accordingly, the memory of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIG. 2. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various examples, virtual machine(s) running on the network traffic manager apparatus 14 may be managed or supervised by a hypervisor.

The plurality of I/O modules 32, the plurality intermediate modules 34, and the plurality endpoints 36 may each comprise processors coupled to memory, although the endpoints may comprise other types and/or numbers of other components and/or elements in other configurations. The processor may comprise one or more central processing units ("CPUs") or general purpose processors with one or more processing cores, such as AMD® processor(s), although other types of processor(s) could be used (e.g., Intel®). The memory may comprise RAM, ROM, flash memory, CD-ROM, floppy disk, hard disk drive(s), solid state memory, DVD, or any other memory storage types or devices, including combinations thereof, which are known to those of ordinary skill in the art. The memory of each of the plurality of I/O modules 32, the plurality intermediate modules 34, and the plurality endpoints 36 may be executed by the corresponding one of the processors. The memory of the plurality of I/O modules 32, the plurality intermediate modules 34, and the plurality endpoints 36 can be implemented as operating system extensions, module, plugins, or the like or may be operative in a cloud-based computing environment. Moreover, the plurality of I/O modules 32, the plurality intermediate modules 34, and the plurality endpoints 36 are not limited to a particular configuration. The capacity of the memory or speed of the processors can vary. Restrictions on the circuitry, internal/external chips and modules interconnect speeds can have network input or output caps or bandwidth restrictions which prevent the intermediate modules 34 from having identical or symmetric network path capacity to service each endpoint 36 which can lead to suboptimal performance across the system.

The connections between the plurality of I/O modules 32, the plurality intermediate modules 34, and the plurality endpoints 36 can be designed for asymmetric load balancing of data or traffic for optimal performance and throughput. In this example, the network traffic management system may receive large volumes of traffic, requiring the storage of the received packets in the traffic for future use. To store the large volume of received packets, the plurality of endpoints 36 may be used as storage. The received packets can be routed to the plurality of endpoints 36 by traveling through the plurality of I/O modules 32 and the plurality of intermediate modules 34. In this example, the plurality of I/O modules 32 can each be a direct memory access hardware circuit called a HDE that is connected to one of the plurality of intermediate modules 34. The plurality of intermediate modules 34 can have different capacities as described above and as depicted in FIGS. 3 and 4 as different sized PDEs. The plurality of endpoints 36 depicted as TMMs in FIGS. 3 and 4, can also have different capacities as described above. Multiple intermediate modules 34 can be connected to a single endpoint 36. By having different capacities for the plurality intermediate modules 34 and the plurality endpoints 36, and by not having a one to one connection between the plurality intermediate modules 34 and the plurality endpoints 36, an asymmetric internal network traffic management system can be designed for optimal performance and throughput.

The communication system 24 in the network traffic manager apparatus 14 is used to operatively couple and communicate between the network traffic manager apparatus 14, the plurality of client computing devices 12(1)-12(n), and the plurality of servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used.

Each of the plurality of client computing devices 12(1)-12(n) of the network traffic management system 10, include a central processing unit (CPU) or processor, a memory, input/display device interface, configurable logic device and an input/output system or I/O system, which are coupled together by a bus or other link. The plurality of client computing devices 12(1)-12(n), in this example, may run interface applications, such as Web requests, that may provide an interface to make requests for and send and/or receive data to and/or from the servers 16(1)-16(n) via the network traffic manager apparatus 14. Additionally, the plurality of client computing devices 12(1)-12(n) can include any type of computing device that can receive, render, and facilitate user interaction, such as client computers, network computer, mobile computers, mobile phones, virtual machines (including cloud-based computer), or the like. Each of the plurality of client computing devices 12(1)-12(n) utilizes the network traffic manager apparatus 14 to conduct one or more operations with the servers 16(1)-16(n), such as to obtain data and/or access the applications from one of the servers 16(1)-16(n), by way of example only, although other numbers and/or types of systems could be utilizing these resources and other types and numbers of functions utilizing other types of protocols could be performed.

Each of the plurality of servers 16(1)-16(n) of the network traffic management system include a central processing unit (CPU) or processor, a memory, and a communication system, which are coupled together by a bus or other link, although other numbers and/or types of network devices could be used. Generally, the plurality of servers 16(1)-16(n) process requests for providing access to one or more enterprise web applications received from the plurality of client computing devices 12(1)-12(n), network traffic manager apparatus 14, via the communication network 30 according to the HTTP-based application RFC protocol or the CIFS or NFS protocol in this example, but the principles discussed herein are not limited to this example and can include other application protocols. A series of applications may run on the plurality servers 16(1)-16(n) that allows the transmission of applications requested by the plurality of client computing devices 12(1)-12(n), or the network traffic manager apparatus 14. The plurality of servers 16(1)-16(n) may provide data packets or receive data packets in response to requests directed toward the respective applications on the plurality servers 16(1)-16(n) from the plurality of client computing devices 12(1)-12(n) or the network traffic manager apparatus 14. It is to be understood that the plurality of servers 16(1)-16(n) may be hardware or software or may represent a system with multiple external resource servers, which may include internal or external networks.

Although the plurality of servers 16(1)-16(n) are illustrated as single servers, each of the plurality of servers 16(1)-16(n) may be distributed across one or more distinct network computing devices. Moreover, the plurality of servers 16(1)-16(n) are not limited to a particular configuration. Thus, the plurality of plurality servers 16(1)-16(n) may contain a plurality of network computing devices that operate using a master/slave approach, whereby one of the network computing devices of the plurality of servers 16(1)-16(n) operate to manage and/or otherwise coordinate operations of the other network computing devices. The plurality of servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the one or more of the plurality of servers 16(1)-16(n) depicted in FIG. 1 can operate within network traffic manager apparatus 14 rather than as a stand-alone server communicating with network traffic manager apparatus 14 via the communication network(s) 30. In this example the plurality of servers 16(1)-16(n) operate within the memory 20 of the network traffic manager apparatus 14.

While the network traffic manager apparatus 14 is illustrated in this example as including a single device, the network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, plurality of servers 16(1)-16(n) or, the network traffic manager apparatus 14, or applications coupled to the communication network(s), for example. Moreover, one or more of the devices of the network traffic manager apparatus 14 in these examples can be in a same or a different communication network 30 including one or more public, private, or cloud networks, for example.

Although an exemplary network traffic management system 10 with the plurality of client computing devices 12(1)-12(n), the network traffic manager apparatus 14, and the plurality of servers 16(1)-16(n), communication networks 30 are described 275 and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14, the plurality of client computing devices 12(1)-12(n), the plurality of servers 16(1)-16(n), for example, may be configured to operate as virtual instances on the same physical machine. In other words, one or more of network traffic manager apparatus 14, the plurality of client computing devices 12(1)-12(n), or the plurality of servers 16(1)-16(n) illustrated in FIG. 1 may operate on the same physical device rather than as separate devices communicating through a network as depicted in FIG. 1. There may be more or fewer plurality of client computing devices 12(1)-12(n), network traffic manager apparatus 14, or the plurality of servers 16(1)-16(n) than depicted in FIG. 1. The plurality of client computing devices 12(1)-12(n), the plurality of servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for allocating a traffic load through a heterogenous topology will now be described with reference to FIGS. 1-4. First in step 205, the network traffic manager apparatus 14 receives a received packet from a traffic flow from one of the plurality of client computing devices 12(1)-12(n), although the network traffic manager apparatus 14 can receive packets in other manners and from other sources. In this example, the network traffic manager apparatus 14 receives the received packet that needs to flow through one of the intermediate modules 34 depicted as PDEs to one of the endpoints 36 depicted as TMMs as shown in FIGS. 3 and 4.

In step 210, the network traffic manager apparatus 14 extracts a header of each of the received packets of the traffic flow received from the one of the plurality of client computing devices 12(1)-12(n). In this example, the network traffic manager apparatus 14 extracts the headers of the received packets to later generate an index corresponding to each of the received packets. A header of a received packet can contain multiple fields. In some examples, fields from the headers can also be used to generate the index. In some examples, the network traffic manager apparatus 14 can use the index generated from the headers to identify how the received packet needs to be properly routed.

In step 215, the network traffic manager apparatus 14 executes a hashing function over the fields of each of the headers to generate the index for each corresponding one of the received packets. When the network traffic manager apparatus 14 executes a hashing function over the fields of each of the headers of each received packet, the hashing function can serve to generate an index for each of the headers which are stored in a column in a redistribution table. The hashing function executed can be any function known in the art that can be used to map data of arbitrary size to fixed-size values. In this example, the network traffic manager apparatus 14 can take fields from the headers of each of the received packets and can generate the index as an integer of a fixed-size value to be used in the redistribution table.

In step 220, the network traffic manager apparatus 14 applies a load balancing function to determine one of a plurality of endpoints 36 to send each of the received packets based on one or more endpoint characteristics. The selected one of the endpoints 36 for each of the received packets is stored in another column in a corresponding row with the generated index in the other column from the prior step in the redistribution table to generate a mapping. Using a load balancing function known in the art, the network traffic manager apparatus 14 can determine for each of the received packets a selected one of the plurality of endpoints 36 to send the corresponding one of the received packets. The network traffic manager apparatus 14 can also determine how to distribute the received packets to the intermediate modules 34 or endpoints 36 based on the application of this load balancing function. Accordingly, the network traffic manager apparatus 14 determines based on applying the load balancing function how to distribute received packets based on the generated index. The network traffic manager apparatus 14 applying this load balancing function does not automatically, evenly distribute the index generated for each of the received packets in the flow of traffic among the intermediate modules 34 or endpoints 36. By way of example, in a case where the sizes of capacity of the intermediate modules 34 or endpoints 36 vary, the network traffic manager apparatus 14 applying the load balancing function can account for the different sizes of capacity of the intermediate modules 34 or endpoints 36 by taking this intermediate and/or endpoint capacity into account when distributing the indexed headers among the intermediate modules 34 or endpoints 36 and this may result in an uneven, but more effective and efficient distribution. As a non-limiting example, as depicted in FIGS. 3 and 4, PDE 4 and PDE 5 have a smaller capacity than the remaining PDEs. Due to the smaller capacity, the network traffic manager apparatus 14 can direct less received packets through PDE 4 and PDE 5 than the remaining PDEs. If a selected one of the endpoints 36 similarly has a smaller capacity than the remaining ones of the endpoints 36, then the network traffic manager apparatus 14 can similarly direct less received packets through the selected one of the endpoints 36 that has the smaller capacity. By way a similar approach can be used based on the identified capacity of the intermediate modules 34.

Additionally, the network traffic manager apparatus 14 applying the load balancing function to optimize traffic can also direct routing of the received packets through different intermediate modules 34 to be sent to the same endpoint 36. For example, packets routed through PDE 4 and PDE 5 can all be directed to TMM 4 instead of different TMMs. As a result of allowing different intermediate modules 34 to send packets to the same endpoint 36, the traffic can be disaggregated evenly to endpoints 36 instead of evenly to the intermediate modules 34 or PDEs. In this example, the load balancing function does not assume all endpoints 36 or TMMs have the same intermediate module 34 or PDE allocation.

In step 225, the network traffic manager apparatus 14 sends each of the received packets to each respective selected endpoint 36 based on the mapping from the application of the load balancing policy and then this exemplary process may end at step 230. More specifically, in this example, the network traffic manager apparatus 14 takes each of the indexes, each generated from the extracted header of each received packet, and then uses the generated redistribution table with these indexes and sends the corresponding received packet to the selected endpoint mapped to the corresponding one of the indexes in the redistribution table. In some examples, the endpoints 36 may receive a balanced portion of the overall traffic, which may indicate that each endpoint 36 was mapped to an equal number of generated indexes that are stored in the redistribution table. In other examples, each endpoint 36 may be mapped to an unequal number of the generated indexes that are stored in the redistribution table which indicates that there is an unbalanced portion of the overall traffic flow to each of the endpoints 36. By supporting an asymmetric load balancing scheme and topology, the system can effectively avoid overloading endpoints 36 and/or intermediate modules 34. Additionally, the system can avoid dropping received packets causing global backoff from the traffic flow.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for allocating a traffic load through a heterogenous topology of a network, the method implemented by a network traffic management system comprising one or more network traffic apparatuses, client devices, or server devices, the method comprising:
    extracting a header of each of a plurality of received packets of a traffic flow, wherein each of the headers comprises fields utilized to direct the corresponding one of the received packets through the network;
    executing a hashing function over the fields of each of the extracted headers to generate an index for each corresponding one of the received packets,
    applying a load balancing function to determine one of a plurality of endpoints to send each of the received packets based on one or more endpoint characteristics, wherein the load balancing function does not evenly divide the plurality of received packets among the plurality of endpoints;
    mapping the index for each corresponding one of the received packets to the corresponding selected one of the endpoints; and
    sending the received packets to each selected endpoint based on the mapping from the load balancing function.

2. The method as set forth in claim 1 wherein the one of the endpoint characteristics comprises an identified capacity of each of the plurality of endpoints.

3. The method as set forth in claim 1 wherein the load balancing function further comprises:
    selecting one of a plurality of intermediate modules based on one or more intermediate characteristics of each of the intermediate modules; and
    determining a route to the selected endpoint for each of the plurality of received packets through the selected one of the intermediate modules.

4. The method as set forth in claim 3 wherein the one of the one or more intermediate characteristics comprises a capacity of each of the intermediate modules.

5. The method as set forth in claim 3 wherein the load balancing function does not evenly divide the plurality of received packets among the plurality of intermediate modules.

6. A non-transitory computer readable medium having stored thereon instructions for allocating a traffic load through heterogenous topology of a network comprising executable code which when executed by one or more processors, causes the processors to:
    extract a header of each of a plurality of received packets of a traffic flow, wherein each of the headers comprises fields utilized to direct the corresponding one of the received packets through the network;
    execute a hashing function over the fields of each of the extracted headers to generate an index for each corresponding one of the received packets,
    apply a load balancing function to determine one of a plurality of endpoints to send each of the received packets based on one or more endpoint characteristics, wherein the load balancing function does not evenly divide the plurality of received packets among the plurality of endpoints;
    map the index for each corresponding one of the received packets to the corresponding selected one of the endpoints; and
    send the received packets to each selected endpoint based on the mapping from the load balancing function.

7. The medium as set forth in claim 6 wherein the one of the endpoint characteristics comprises an identified capacity of each of the plurality of endpoints.

8. The medium as set forth in claim 6 wherein the load balancing function further comprises:
    selecting one of a plurality of intermediate modules based on one or more intermediate characteristics of each of the intermediate modules; and determining a route to the selected endpoint for each of the plurality of received packets through the selected one of the intermediate modules.

9. The medium as set forth in claim 8 wherein the one of the one or more intermediate characteristics comprises a capacity of each of the intermediate modules.

10. The medium as set forth in claim 8 wherein the load balancing function does not evenly divide the plurality of received packets among the plurality of intermediate modules.

11. A network traffic manager apparatus, comprising memory comprising programmed instructions stored in the memory and one or more processors configured to be capable of executing the programmed instructions stored in the memory to:
    extract a header of each of a plurality of received packets of a traffic flow, wherein each of the headers comprises fields utilized to direct the corresponding one of the received packets through the network;
    execute a hashing function over the fields of each of the extracted headers to generate an index for each corresponding one of the received packets,
    apply a load balancing function to determine one of a plurality of endpoints to send each of the received packets based on one or more endpoint characteristics, wherein the load balancing function does not evenly divide the plurality of received packets among the plurality of endpoints;
    map the index for each corresponding one of the received packets to the corresponding selected one of the endpoints; and
    send the received packets to each selected endpoint based on the mapping from the load balancing function.

12. The device as set forth in claim 11 wherein the one of the endpoint characteristics comprises an identified capacity of each of the plurality of endpoints.

13. The device as set forth in claim 11 wherein the load balancing function further comprises:
    selecting one of a plurality of intermediate modules based on one or more intermediate characteristics of each of the intermediate modules; and
    determining a route to the selected endpoint for each of the plurality of received packets through the selected one of the intermediate modules.

14. The device as set forth in claim 13 wherein the one of the one or more intermediate characteristics comprises a capacity of each of the intermediate modules.

15. The device as set forth in claim 13 wherein the load balancing function does not evenly divide the plurality of received packets among the plurality of intermediate modules.

16. A network traffic management system, comprising one or more traffic management apparatuses, client devices, or server devices, the network traffic management system comprising memory comprising programmed instructions stored thereon and one or more processors configured to be capable of executing the stored programmed instructions to:
    extract a header of each of a plurality of received packets of a traffic flow, wherein each of the headers comprises fields utilized to direct the corresponding one of the received packets through the network;
    execute a hashing function over the fields of each of the extracted headers to generate an index for each corresponding one of the received packets,
    apply a load balancing function to determine one of a plurality of endpoints to send each of the received packets based on one or more endpoint characteristics, wherein the load balancing function does not evenly divide the plurality of received packets among the plurality of endpoints;
    map the index for each corresponding one of the received packets to the corresponding selected one of the endpoints; and
    send the received packets to each selected endpoint based on the mapping from the load balancing function.

17. The network traffic management system of claim 16, wherein the one of the endpoint characteristics comprises an identified capacity of each of the plurality of endpoints.

18. The network traffic management system of claim 16, wherein the load balancing function further comprises:
    selecting one of a plurality of intermediate modules based on one or more intermediate characteristics of each of the intermediate modules; and
    determining a route to the selected endpoint for each of the plurality of received packets through the selected one of the intermediate modules.

19. The network traffic management system of claim 18, wherein the one of the one or more intermediate characteristics comprises a capacity of each of the intermediate modules.

20. The network traffic management system of claim 18, wherein the load balancing function does not evenly divide the plurality of received packets among the plurality of intermediate modules.

\* \* \* \* \*